US006668287B1

(12) United States Patent
Boyle et al.

(10) Patent No.: US 6,668,287 B1
(45) Date of Patent: Dec. 23, 2003

(54) SOFTWARE DIRECT MEMORY ACCESS

(75) Inventors: Patrick Boyle, Los Altos, CA (US); David Keppel, Seattle, WA (US); Alex Klaiber, Menlo Park, CA (US); Edmund Kelly, San Jose, CA (US)

(73) Assignee: Transmeta Corporation, Santa Clara, CA (US)

(*) Notice: Subject to any disclaimer, the term of this patent is extended or adjusted under 35 U.S.C. 154(b) by 0 days.

(21) Appl. No.: 09/464,661

(22) Filed: Dec. 15, 1999

(51) Int. Cl.[7] .......................... G06F 13/20; G06F 13/28
(52) U.S. Cl. .............................. 710/22; 710/23; 710/24; 710/48; 710/52
(58) Field of Search ........................... 710/22, 23, 24, 710/48, 52

(56) References Cited

U.S. PATENT DOCUMENTS

| | | | | |
|---|---|---|---|---|
| 5,161,217 A | * | 11/1992 | Lemay et al. .................. 711/1 |
| 5,283,883 A | * | 2/1994 | Mishler ........................ 710/22 |
| 5,878,246 A | * | 3/1999 | Hildenbrand ................. 703/27 |
| 6,029,255 A | * | 2/2000 | Yamada ........................ 714/16 |
| 6,055,545 A | * | 4/2000 | Yazaki et al. ................ 707/200 |
| 6,167,455 A | * | 12/2000 | Friedman et al. ............ 709/320 |
| 6,173,358 B1 | * | 1/2001 | Combs ......................... 711/100 |
| 6,199,152 B1 | * | 3/2001 | Kelly et al. .................. 711/206 |
| 6,230,259 B1 | * | 5/2001 | Christie et al. ............. 712/228 |
| 6,266,767 B1 | * | 7/2001 | Feiste et al. .................. 710/54 |
| 6,314,560 B1 | * | 11/2001 | Dunn et al. .................. 712/216 |
| 6,324,644 B1 | * | 11/2001 | Rakavy et al. ................. 713/1 |

* cited by examiner

Primary Examiner—Rehana Perveen

(57) ABSTRACT

Apparatus and a method for generating an interrupt when a direct memory access by an I/O device is desired, suspending the operation of the microprocessor in response to the interrupt, placing state of the morph host to a last known correct state in response to the interrupt, determining the memory operation commanded by the I/O device, and utilizing the microprocessor to execute the memory operation commanded by the I/O device.

20 Claims, 4 Drawing Sheets

SOFTWARE DIRECT MEMORY ACCESS

BACKGROUND OF THE INVENTION

1. Field of the Invention

This invention relates to computer systems and, more particularly, to methods and apparatus for allowing input/output devices to directly access memory.

2. History of the Prior Art

Recently, a new microprocessor was developed which combines a simple but very fast host processor (called a "morph host") and software (called "code morphing software") to execute application programs designed for a processor different than the morph host processor at a rate which cannot be attained by the processor for which the programs were designed (the target processor). The morph host processor executes the code morphing software to translate the application programs into morph host processor instructions which accomplish the purpose of the original target software. As the target instructions are translated, they are both executed and stored in a translation buffer where they may be accessed without further translation. Although the initial translation and execution of a program is slow, once translated, many of the steps normally required to execute a program in hardware are eliminated.

In order to be able to execute programs designed for other processors at a rapid rate, the morph host processor includes a number of hardware enhancements. One of these enhancements is a gated store buffer which resides between the host processor and the translation buffer. A second enhancement is a set of host registers which store the state of the target machine at the beginning of any sequence of target instructions being translated. Sequences of target instructions spanning known states of the target processor are translated into morph host instructions and placed in the translation buffer awaiting execution. If the translated instructions execute without raising an exception, the target state at the beginning of the sequence of instructions is updated to the target state at the point at which the sequence completed.

If an exception occurs during the execution of the sequence of host instructions which have been translated, the processing stops; and the entire operation may be returned to the beginning of the sequence of target instructions at which known state of the target machine exists. This allows very rapid and accurate handling of exceptions while dynamically translating and executing instructions, a result which had never been accomplished by the prior art.

Another hardware enhancement that the new microprocessor includes is circuitry for aliasing memory data that is frequently utilized during execution of a series of instructions in execution unit registers. Aliasing (or copying memory contents to a register) allows very rapid access of memory for data which is used frequently during a series of operations.

Although the new microprocessor includes a number of hardware features which allow the code morphing software and the morph host to cooperate with one another to carry out the functions of a typical microprocessor, the new microprocessor does not include most of the hardware features utilized by a conventional microprocessor. The new processor is described in detail in U.S. Pat. No. 5,926,832, entitled *Method and Apparatus for Aliasing Memory Data in an Advanced Microprocessor*, Wing et al, issued Jul. 20, 1999, and assigned to the assignee of the present application.

One of the hardware features of a typical microprocessor which is not included is hardware by which direct access of memory by input/output (I/O) devices may be accomplished. Direct memory access (DMA) is especially desirable because it allows the use of master I/O devices which may themselves control operations on the I/O bus such as the storage in memory of data being transferred to the computer.

However, the hardware required to provide direct memory access is quite complicated and significantly increases the circuitry of a processor. Such circuitry typically includes not only circuitry for accomplishing the direct access of memory but circuitry which checks the ordering of operations and assures the maintenance of consistency for data stored in various caches of a microprocessor in order to allow the use of DMA circuitry. Circuitry for maintaining consistency, especially, would need to be greatly enhanced for hardware DMA to be utilized in the new microprocessor because of the large increase in functions that have cache-like aspects in the new microprocessor. For example, data held in the gated store buffer before being stored in memory and memory data aliased in execution unit registers to speed memory access operations must be consistent with memory data. Moreover, translated instructions stored in the translation buffer that are affected by direct access of target memory must be cognizant that the memory upon which they depend may have changed invalidating the translation.

It is desirable to provide circuitry and software for allowing direct memory access in a computer utilizing the new microprocessor.

SUMMARY OF THE INVENTION

The present invention is realized by apparatus and a method for generating an interrupt when a direct memory access by an I/O device is desired, suspending the operation of the microprocessor in response to the interrupt, placing state of the morph host to a last known correct state in response to the interrupt, determining the memory operation commanded by the I/O device, and utilizing the microprocessor to execute the memory operation commanded by the I/O device.

These and other objects and features of the invention will be better understood by reference to the detailed description which follows taken together with the drawings in which like elements are referred to by like designations throughout the several views.

DETAILED DESCRIPTION

Figure 1:
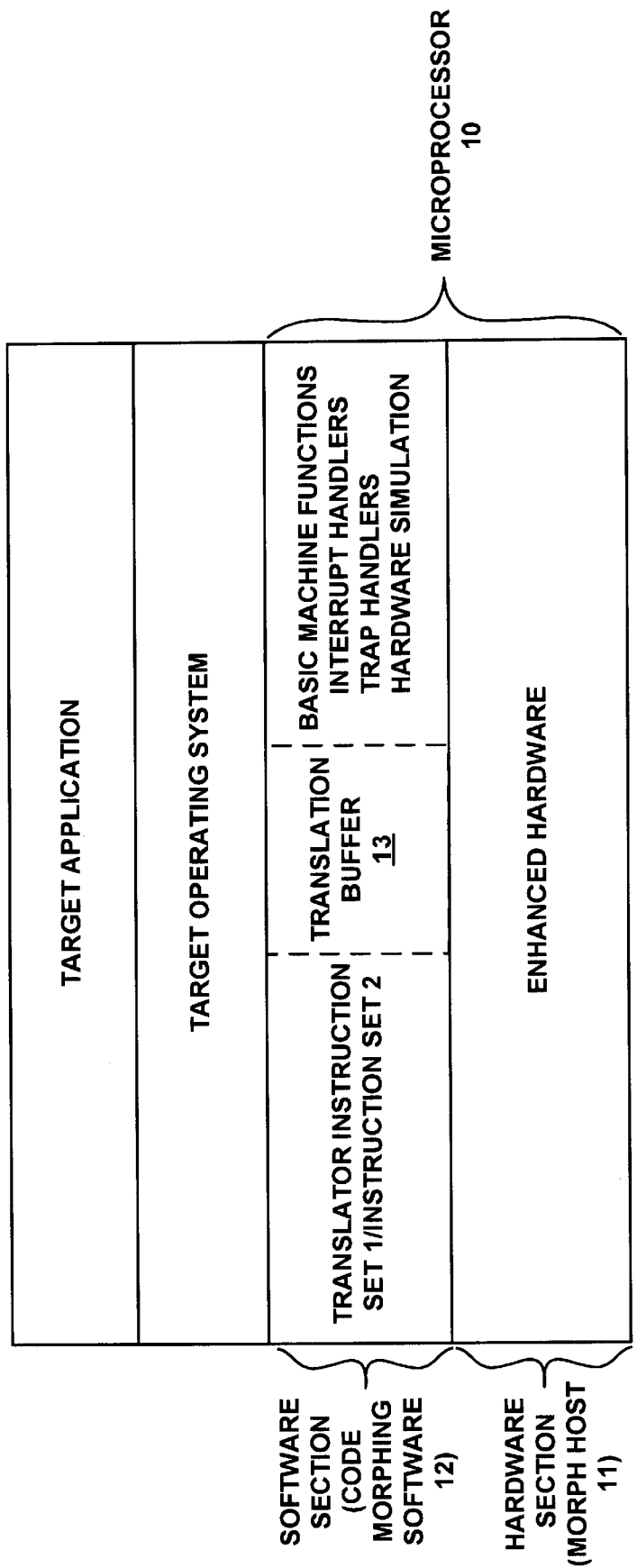
FIG. 1 is a diagram illustrating a new microprocessor which may utilize the present invention.

FIG. 1 illustrates a new microprocessor 10 which combines an enhanced hardware processing portion 11 (referred to as a "morph host") which is much simpler than state of the art microprocessors and an emulating software portion 12 (referred to as "code morphing software"). The two portions function together to carry out the operations normally accomplished by hardware alone in an advanced microprocessor. The new microprocessor 10 runs as rapidly as microprocessors of the prior art, is capable of running all of the software for a plurality of operating systems which may be run by a large number of families of prior art microprocessors, and is less expensive to manufacture and operate than prior art microprocessors.

Figure 2:
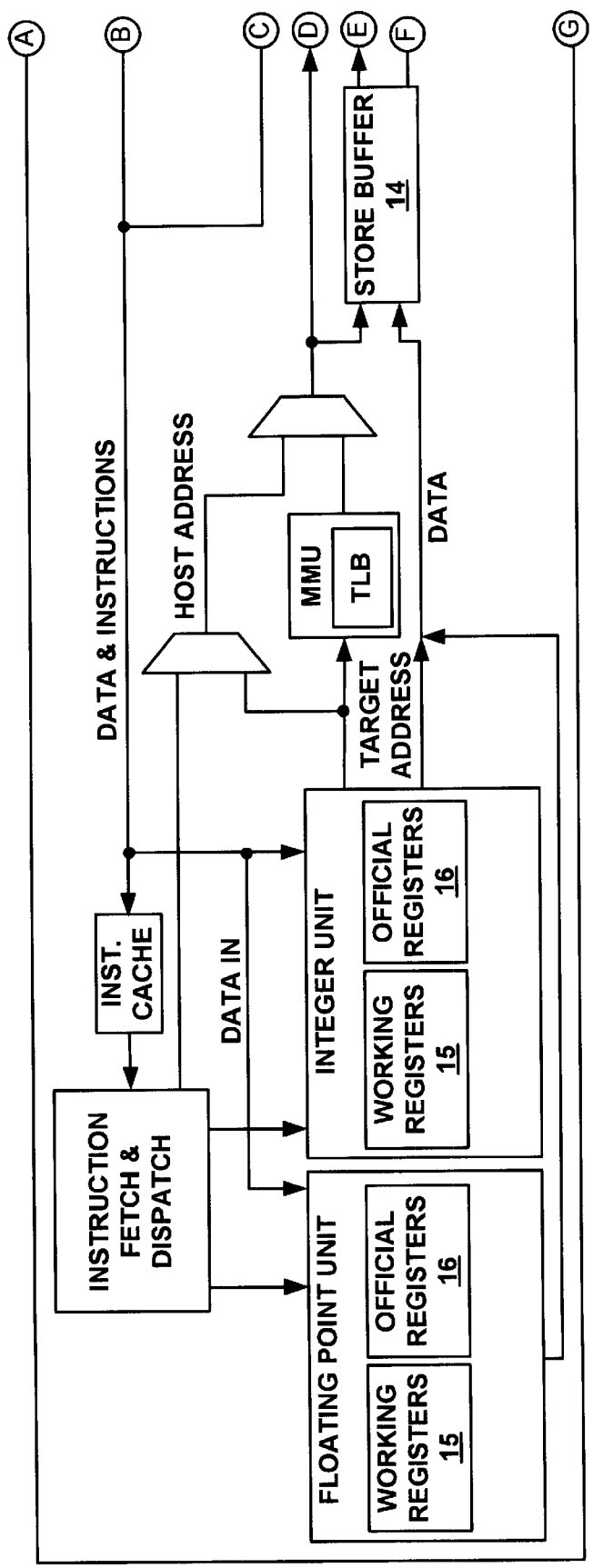
FIG. 2 is a block diagram of circuitry for implementing the hardware portion of the new microprocessor of FIG. 1.
Figure 2:
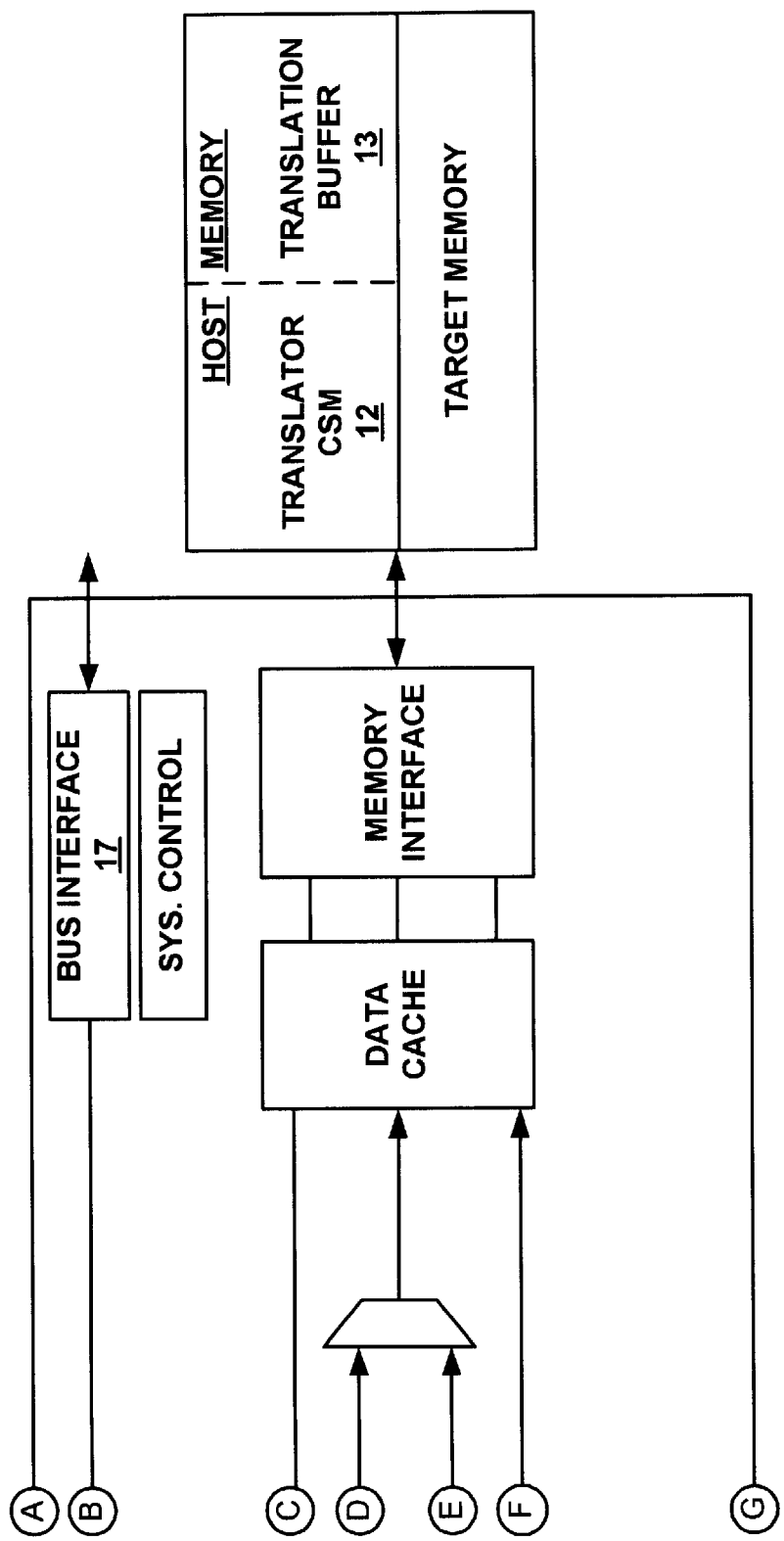

The microprocessor 10 includes a morph host processor 11 designed to execute code morphing software 12 for executing application programs designed for a different target processor. The morph host 11 includes hardware enhancements especially adapted to allow the acceleration techniques provided by the code morphing software 12 to be utilized efficiently. The hardware enhancements, among other things, assist in accelerating operations and in providing state of a target processor immediately when an exception or error occurs. The code morphing software includes software which, among other things, translates the instructions of a target program to morph host instructions, schedules and optimizes host instructions, and responds to exceptions and errors when necessary by rolling back execution to the last point at which execution is known to have completed correctly and by replacing working state with correct target state at that point so that correct retranslations of target code may occur. Code morphing software also includes various processes for enhancing the speed of processing. The block diagram of FIG. 2 illustrates in detail exemplary hardware of a morph host 11 which implements the features discussed herein.

The code morphing software 12 combined with the enhanced morph host 11 translates target instructions into instructions for the morph host on the fly and caches those host instructions in a memory data structure (referred to as a "translation buffer" 13). Once a target instruction has been translated, the host translation may be recalled from the translation buffer 13 and executed without the need for any of the myriad of steps required by prior art hardware microprocessors such as: determining which primitive instructions are required to implement each target instruction, addressing each primitive instruction, fetching each primitive instruction, optimizing the sequence of primitive instructions, allocating assets to each primitive instruction, reordering the primitive instructions, and executing each step of each sequence of primitive instructions involved each time each target instruction is executed.

A primary problem of prior art emulation techniques has been the inability to handle exceptions generated during the execution of a target program with good performance. Some exceptions generated in running the target application are directed to the target operating system, and the correct target state must be available at the time of any such exception in order for proper execution of the exception and the instructions which follow to occur. Other exceptions can be generated by the emulator to detect particular target operations which have been replaced by some particular host function. The host processor executing the host instructions derived from the target instructions can also generate exceptions. All of these exceptions can occur either during the attempt to change target instructions into host instructions by the emulator, or when the emulating host instructions are executed by the host processor. Exceptions directed to the target operating system are especially difficult because they require a knowledge of the state of the target processor at all times.

In order to recover from these exceptions efficiently, the enhanced morph host 11 includes a number of hardware improvements. These improvements include a gated store buffer 14. The gated store buffer 14 stores working memory state changes on an "uncommitted" side of a hardware "gate" and official memory state changes on a "committed" side of the hardware gate where these committed stores "drain" to main memory. A "commit" operation transfers memory stores from the uncommitted side of the gate to the committed side of the gate.

The hardware improvements also include a large plurality of additional processor registers. In addition to allowing register renaming to lessen the problem of instructions trying to utilize the same hardware resources, the additional registers allow the maintenance of a set of host or working registers 15 for processing the host instructions and a set of target registers 16 to hold the official state of the target processor for which the target application was originally created. The target registers are connected to their working register equivalents through a dedicated interface that allows a commit operation to quickly transfer the content of all working registers to official target registers and allows an operation called "rollback" to quickly transfer the content of all official target registers back to their working register equivalents.

The additional registers and the gated store buffer allow the state of memory and the state of the target registers to be updated together once one or a group of target instructions have been translated and run without error. Updates are chosen by the code morphing software to occur on integral target instruction boundaries. If the primitive host instructions generated by a translation of a series of target instructions are run by the host processor without generating an exception, then the working memory stores and working register state generated by those instructions are transferred to official memory and to the official target registers.

On the other hand, if an exception occurs when processing the host instructions at a point which is not on a target instruction boundary, the original state in the target registers at the last update (or commit) may be recalled to the working registers and uncommitted memory stores in the gated store buffer may be discarded. Then, if the exception generated is a target exception, the target instructions causing the target exception may be retranslated one at a time and executed in serial sequence as they would be executed by a target microprocessor. As each target instruction is correctly executed without error, the state of the target registers may be updated; and the data in the store buffer gated to memory. Then, when the exception occurs again in running the host instructions, the correct state of the target processor is held by the target registers of the morph host and memory; and the operation may be correctly handled without delay. Each new translation generated by this corrective translating may be cached for future use as it is translated or alternatively discarded if caused by a one time or rare occurrence such as a page fault. These features combine to assist the microprocessor created by the combination of the code morphing software 12 and the morph host 11 to execute instructions at least as rapidly as processors for which the software was originally written.

In addition to simply translating the instructions, caching the translated instructions, and executing each translation whenever that set of instructions needs to be executed, the code morphing software 12 also reorders, optimizes, and reschedules the different translations. One optimizing process links the various sequences of translated host instructions to one another as the probable branches to be taken become apparent during execution. Eventually, the main loop references in the branch instructions of host instructions are almost completely eliminated. When this condition is reached, the time required to fetch target instructions, decode target instructions, fetch the primitive instructions which make up the target instructions, optimize those primitive operations, reorder the primitive operations, and reschedule those primitive operations before running any host instruction is eliminated. Thus, the work required to run any set of target instructions using the improved microprocessor is drastically reduced.

In one embodiment of the new microprocessor 10, a circuit arrangement has been provided that allows memory data used quite often in the execution of an operation to be replicated (or "aliased") in an execution unit register (e.g., an integer unit register) in order to eliminate the time required to fetch the data from or store the data to memory. For example, if data in memory is reused frequently during the execution of one or more code sequences, the data must typically be retrieved from memory and loaded to a register in an execution unit each time the data is used. To reduce the time required by such frequent memory accesses, the data may instead be loaded once from memory to an execution unit register at the beginning of the code sequence and the register designated to function in place of the memory space during the period in which the code sequence continues. Once this has been accomplished, each of the load operations which would normally involve loading data to a register from the designated memory address becomes instead a simple register-to-register copy operation which proceeds at a much faster pace; and even those copy operations may frequently be eliminated by further optimization.

Similarly, execution of a code sequence often requires that data be written to a memory address frequently during the execution of a code sequence. To reduce the time required by such frequent memory stores to the same address, each time the data is to be written to the memory address, it may be transferred to an execution unit register which is designated to function in place of the memory space during the period in which the code sequence is continuing. Once an execution unit register has been designated, each change to the data requires only a simple register-to-register transfer operation which proceeds much faster than storing to a memory address.

It will also be recognized by those skilled in the art that the translation buffer 13 used by the new microprocessor stores translated instructions which may depend upon data stored in memory. If that data stored in memory is changed in some way by a direct memory access, then the translated instructions may no longer carry out the desired operation. If this occurs, then the translated instructions must be made consistent with the memory condition caused by the direct memory access.

Thus, it will be seen that the new microprocessor includes a number of cache-like arrangements which must remain consistent throughout the operation of any computer utilizing the new microprocessor. If the new microprocessor is to allow direct memory access operations under control of an I/O device, then the consistency of these arrangements must be maintained.

Furthermore, the new microprocessor schedules and reorders operations typically during intervals between one point at which a commit occurs and another such commit point. If the scheduling, reordering, or other optimization causes the sequence of instructions to execute incorrectly, then the operation rolls back to the last commit point where correct target state is known and the translated instructions are discarded. If the new microprocessor is to carry out direct memory access operation under control of an I/O device, then the order of operations must be maintained correctly even though direct memory access is allowed.

The present invention provides circuitry and a process for allowing the new microprocessor 10 to accomplish direct memory access under control of an I/O device while maintaining data consistency and an operational order for correctly executing processes throughout its many operations. The present invention accomplishes this without the addition of any significant amount of circuitry.

The present invention accomplishes these desirable results by an entirely new approach to the process of direct memory access. Rather than providing extensive hardware for accomplishing this task, the present invention utilizes the fast morph host processor to accomplish direct memory access. The primary purposes of direct memory access are to decouple the central processor from the slower speed of devices on the I/O bus and to relieve the processor of the load required by direct memory access. However, it has been discovered that with fast microprocessors the time actually required to perform DMA operations in software can be reduced to a relatively small percentage of all operations. Consequently, by providing relatively simple hardware support for DMA operations a fast processor has the ability to practice direct memory access in software without significantly slowing its operations. Moreover, allowing the morph host processor in software to accomplish direct memory access eliminates many of the operations which might otherwise be required to be implemented in hardware to maintain consistency without slowing the overall operation of the system.

To allow the new processor to accomplish direct memory access, the processor accepts and queues DMA requests in a first-in first out (FIFO) buffer which is a part of a bus interface circuit 17 shown in FIG. 2. The code morphing software is adapted to respond to a queued request by an I/O device for direct memory access which is signaled by an internally generated DMA exception or interrupt. The exception or interrupt causes the host to invoke a DMA service process, which may be partially or completely implemented in host software. The DMA service process performs a sequence of steps to implement the indicated DMA request. The DMA service process causes the address of the direct memory access request to be placed in a host register. If the target state is consistent, the DMA service process may cause the microprocessor to suspend the process with which it is presently involved and resume it after the DMA service. If the target state is inconsistent, the DMA service process causes the microprocessor to halt the process with which it is presently involved and roll back operations to the last commit point. As was explained above, the sequence of target instructions has been correctly translated and executed without generating an exception before a commit operation is allowed to occur. At a commit point, memory stores generated by correctly executed translations are stored to memory and the state of the target registers is updated to the present state of the working registers. Consequently, memory and registers of the morph host processor include correct target state at each commit point. After a rollback has taken place, the processor is caused to execute the particular direct memory access operation commanded by the I/O device. The exact operation commanded on the I/O bus (along with other status information) is indicated in a PCI Status register 32 (shown in FIG. 3), and a field derived from this command but optimized for efficient software interrupt handler dispatch is indicated in a DMA Status register 33. The physical memory address of the start of the transfer is specified in a processor register DMA Address 35. Once the DMA operation is completed by the morph host processor, the processor reverts back to the interrupted process. If the process was suspended, the processor resumes the process where it was suspended. If the process was halted, the processor reverts back to the interrupted process and continues executing it beginning with the next instruction following the commit point preceding the interruption.

In the preferred embodiment, the host processor normally responds to a DMA request by generating an interrupt. By using an interrupt rather than an exception, the DMA service request may be deferred by using host processor control to block DMA interrupt delivery. Such deferral may be used to simplify the implementation of critical sections, by not demanding that each critical section be coded in a way that it is ready to service a DMA event at all times. There are particular circumstances that demand immediate service of a DMA request before the execution process may proceed. Specifically, a load or store operation may be sent to the system bus, but the system bus or a device on the bus which implements or helps to implement the load or store operation may block that operation until a DMA is serviced. When a pending DMA request must be serviced and may not be deferred, the preferred embodiment generates an exception rather than an interrupt. This construction does not compromise critical sections, however, as most critical sections contain no PCI-bound loads or stores. Even those which do only need to be prepared for DMA service at just those places which actually use PCI-bound loads or stores. Where either an interrupt or an exception have the same effect, the word "interrupt" is used to describe both. Where an interrupt and an exception have different effects, the precise word is used for the description.

Since the processor itself carries out the commanded direct memory access operation, the operation utilizes those features which are normally used by the morph host. No other processor is operating at the same time as the morph host. Thus, in contrast to direct memory access operations provided by prior art processors, any processor caches are under the control of the morph host alone and need not be snooped in order to maintain consistency.

By rolling back the operation of the morph host in response to the DMA interrupt, a number of desirable results are accomplished. First, the working and official registers are made consistent so that these need not be tested against one another. Moreover, the rollback process causes an automatic discard of memory stores in the gated store buffer 14 which have not yet been committed. Since the gated store buffer is utilized to hold memory stores generated by translations and speculative operations which have not yet completed, the rollback eliminates the need to test consistency between memory stores in the gated store buffer and data in memory. Moreover, the effects of memory stores generated by any speculative reordering and scheduling operations which have been placed in the gated store buffer before a determination that the speculation is, in fact, correct or incorrect, are simply discarded.

If the DMA operation has not overwritten the target memory corresponding to the interrupted translation, then, after the rollback and the DMA operation have taken place, execution of the interrupted translation is resumed. If the DMA operation has overwritten the target memory from which the translation was created, the new target instructions now in memory are translated and executed. Thus, consistency of translations is automatically maintained.

Since the morph host processor 11 accomplishes all of the direct memory access operations requested by the I/O devices along with all other processor operations, no ordering problems arise from operating two processors at once during direct memory access operations.

In one particular embodiment of the new processor, utilization of processor registers to alias memory data is specifically designed to have effect only between commit points. That is, data at a memory address is stored in a processor register for an alias operation only during a period between commit operations. Consequently, a rollback operation eliminates all aliasing of memory data in processor registers so that data in these registers need not be tested for consistency with the data at the corresponding memory addresses.

In a second embodiment of the new processor, utilization of processor registers to alias memory data is designed to span commit points. That is, data at a memory address is stored in a processor register for an alias operation both before and after a particular commit operation. Unlike the first embodiment described in the preceding paragraph, a rollback operation does not eliminate all aliasing. The DMA service process therefore executes a sequence of stores to write data stored in processor registers back to memory. The exact sequence of stores is dictated by the alias address and size information, which is stored in the host processor alias unit. The sequence of stores causes memory to become consistent, so the DMA service process may then perform the requested DMA operation as described.

Thus, as may be seen, almost all of the hardware-intensive operations required to test consistency and ordering in direct memory access operation are simply eliminated when software direct memory access is practiced by the new processor as described herein. This has the effect of allowing software direct memory access using the new processor to be accomplished without extensive hardware.

Though most operations for testing consistency during direct memory access are eliminated by the present invention, at least one consistency test must still be conducted. The translation buffer 13 of the morph host processor 11 maintained by the code morphing software 12 is, in effect, a cache of host instructions which depend on the condition of some other portion of memory. If a direct memory access affects memory which stores target instructions that have been translated to host instructions stored in the translation buffer, then the host instructions may not correctly represent the target instructions affected by the direct memory access. Consequently, a direct memory access operation to target memory must test to determine whether the portion of target memory to which a write access is accomplished stores instructions which have been translated to host instructions.

The morph host processor is readily adapted to carry out this particular consistency test during the direct memory access operation. In the new processor, once a sequence of target instructions in target memory have been translated to host instructions and stored in the translation buffer, an indication that the sequence has been translated is provided in a T bit table in memory so that the sequence need not be retranslated. Thus, a memory-address-indexed T bit table includes an indication (a "T" bit) which is set to signify that target instructions at that address have been translated. Consequently, when the morph host processor carries out a direct memory access to write instruction data to target memory, a T bit set at a memory address index indicates that the target memory stores instructions which have been translated so that the morph host processor should invalidate the host instructions in the translation buffer which represent the translations of the target instructions being accessed.

In the preferred embodiment, the hardware circuitry for processing DMA requests is constructed to ensure that no single DMA write operation spans a host page boundary. If a single DMA write request does span page boundaries, the hardware circuitry breaks it into two or more requests before presenting it to the software process that implements the DMA request. Consequently, each invocation of the software process that implements a DMA write is guaranteed to write at most one memory page. Therefore, the software process need not check each memory store to determine whether the "T" bit is set. Instead, the software process may be optimized to check only once per invocation of the software process.

Figure 3:
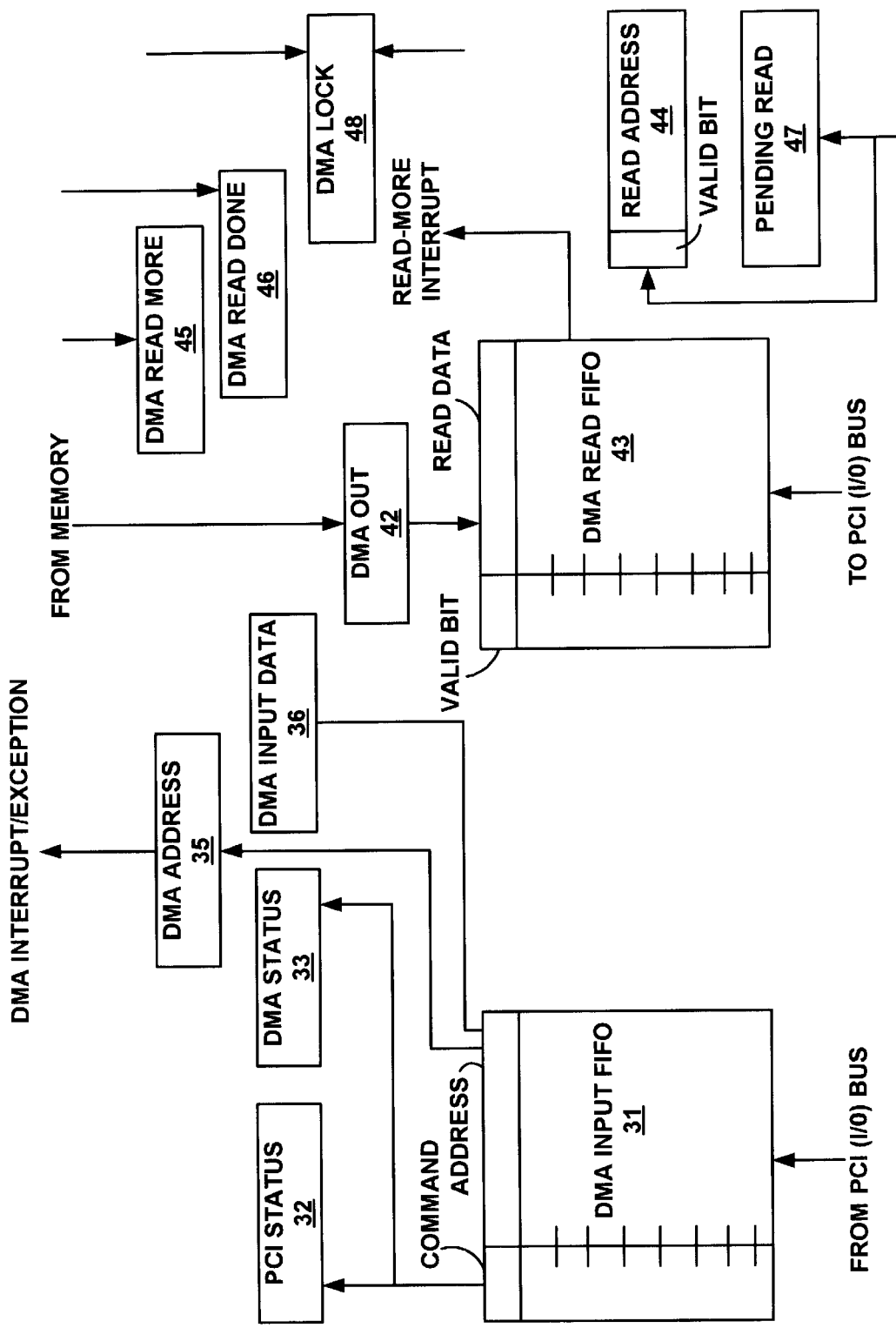
FIG. 3 is a block diagram illustrating one embodiment of circuitry for practicing the present invention.

FIG. 3 illustrates in block diagram form one embodiment of the minimal circuitry utilized to carry out the present invention utilizing the new microprocessor. In order to initiate DMA operations, DMA requests are sent from a device on the I/O bus to a DMA first-in first-out (FIFO) input buffer 31. A DMA request from a device on the bus typically includes a command word and an address. In a particular embodiment utilizing a PCI bus, a command typically utilizes four bits while the address utilizes thirty-two bits. When a command is to write, the command entry is usually followed by some number of thirty-two bit data entries which are queued in the buffer 31 following the command entry.

In the embodiment illustrated, the command bits of the first request in the queue of the FIFO 31 are transferred to a PCI status register 32 and a DMA status register 33. These registers also receive data indicating the type and status of the DMA operation which is to be performed; for example, each entry indicates whether it is directed to a new address. Simultaneously, the address of the DMA memory access is transferred to a DMA Address register 35, and an interrupt is generated to the microprocessor. In the particular embodiment, the act of transferring a new address sets a bit in the register 33 which initiates a DMA interrupt. When the processor decides to take the interrupt (which may be immediately or may be masked to occur later to meet certain circumstances), the interrupt handler of the code morphing software reads a field indicating the type of DMA operation from the DMA status register 33, and the memory address to which the write is directed from address register 35. Reading the address resets the bit which initiated the interrupt so that the code morphing software understands that the address in the register 35 now refers to a command which has already generated an interrupt.

If the request is to write to memory, the request entry in the FIFO 31 is followed by write data which will fill one or more of the next entries in the FIFO. The interrupt handler of the code morphing software responds to the interrupt generated and reads the derived command in the DMA Status register 33 and the write address in the DMA Address register 35.

The software then causes the processor to begin to read the data in the FIFO 31 (which is visible through a data register 36) and stores it to the specified address in memory. The software then reads the DMA status register 33 to determine whether the address for the entry is new, the FIFO 31 is empty, or the address has not changed. So long as the address has not changed, the software causes the data to be transferred entry-by entry through the register 36 to memory.

When write data is transferred through the register 36 to memory by the processor, it passes through the normal processor data path. In so doing, the data is transferred through the processor cache and the gated store buffer 14 so that these caches are brought up to date automatically. Although testing the consistency of the alias registers is a part of the write process of the new microprocessor, as mentioned, aliasing is typically accomplished only during intervals between commit points so that the alias registers need not be snooped. During the DMA write process, a history of the write addresses is recorded by the DMA interrupt handler so that, after the write has been completed, those addresses storing target instructions which have been modified by the DMA write operation may be determined, and the translations related to those addresses stored in memory may be invalidated. In this way, circuitry which might otherwise be necessary for hardware DMA operations to snoop all of these caches is eliminated.

In normal operation, DMA writes may have varying widths and memory alignments. In the preferred embodiment, the write data follows the normal processor data path. In order to write all bytes of valid data and at the same time not overwrite memory with invalid data, the preferred embodiment also passes byte enable data from the PCI status to the target of the DMA write, the store buffer. The byte enables are written using a special "store DMA" instruction that performs an ordinary store except that it utilizes the byte enables directly. Although the processor already implements other aligned and misaligned store operations of various sizes, it would be time-consuming to read the byte enables, decode them, then dispatch to the appropriate store instruction. Using a single "store DMA" instruction saves the time and code space that would be required for decoding and dispatching on each value of the byte enables.

If, when an entry has been written to memory by the processor, the input FIFO 31 is empty, then the DMA status register 33 indicates this to the code morphing software, and the DMA write operation ceases. If the DMA status register 33 indicates instead that the next entry is a new command, the new command will be presented to the software in the registers 32 and 33 and the address in the register 35. Software will typically choose to handle the new request at this time while it is already in the DMA interrupt handler.

If a new request occurs after software has completed its interrupt service, the new request will cause a DMA interrupt to be generated, and handling the new operation commanded commences once the interrupt is accepted by the processor. If the new request is another write request, the operation takes place in the manner described above. If the new request is a read request and software is not already executing the DMA interrupt handler, the transfer of the address to the register 35 generates an interrupt which initiates a rollback operation so that all of the state data in all of the caches is rendered consistent. If software is already executing the DMA interrupt handler, the interrupt and rollback overhead is avoided since a rollback has already occurred. Then the code morphing software reads the derived command in the DMA status register 33 and the read address in the address register 35.

At this point, the code morphing software initiates a read at the memory address indicated. Each piece of data read at the read address is transferred through the normal processor memory read path including the various caches described above and then stored to a DMA Out register 42. Transferring the data is this manner eliminates the need and the circuitry to snoop these caches for consistency. Each entry stored through the register 42 is furnished to a DMA Read FIFO 43 where it is held to be read by the I/O device which initiated the DMA read operation.

During the read operation, the status of the read operation is indicated by the DMA status register 33. Among the details of status held in this register is an indication that the device controlling the operation is still reading data from the FIFO 43. So long as the read is continuing, the status indication advises the code morphing software that it can continue to provide more data from the memory address through the register 42 to the FIFO 43.

The read operation continues until one of a number of things occurs: the FIFO 43 fills, the read is over, or the code morphing software determines that it has transferred enough data or spent enough time servicing the request.

In the embodiment described, the hardware has only one read FIFO and handles only one read at a time. When a read request is presented on the I/O bus in the absence of a pending read request and the FIFO 43 is empty, this read request becomes the "pending" read, and a Pending Read flag in a register 47 is set by the bus interface hardware. The Pending Read flag prevents new requests from being accepted until the pending read is finished.

Bus interface hardware causes the FIFO 43 to be emptied, the read address to be placed in a read address register 44 and a valid bit to be set indicating that the read address 44 is valid and that any contents subsequently placed in FIFO 43 correspond to the address in register 44. The read request is then queued in the FIFO 31 causing a read request interrupt to be sent to the code morphing software. The code morphing software receives the interrupt, looks at the derived command in the register 33 and determines that it is a read request. The processor reads data from the read address and stores the first data entry through the register into the FIFO 43.

Software may continue to fill FIFO 43 up to its limits if the data is not being read by the device, or as long as there is space in the FIFO 43 if the device is reading the data from the FIFO.

The pending read is said to complete when the first data transfer occurs corresponding to a DMA read request, at that time the flag in the Pending Read register 47 is cleared. Each time a data transfer occurs the read address in register 44 is advanced so that it contains the address corresponding to the first unread byte in the FIFO 43.

In order to service DMA reads by slow devices on the bus, the FIFO 43 acts as a prefetch FIFO and allows accumulation of data so that individual interrupts for small transfers need not be serviced individually. When a read request is presented on the I/O bus, and the FIFO 43 is not empty, the read address valid bit is set, and the address presented specifies a byte address greater than or equal to (but within the same 32-bit word as) the read address in register 44, then the read request is said to "hit" in the FIFO. This causes the requested data to be supplied directly from the FIFO 43 without interrupting the processor, and the read address in register 44 to be advanced.

To enforce consistency of the prefetched data in FIFO 43 with memory, the read address valid bit in register 44 is cleared (thereby indicating that the contents of the FIFO 43 are invalid) whenever the pending read flag is cleared and either a DMA write or a programmed I/O write (i.e. a store from the processor to some I/O device) occurs.

To reduce average DMA read service latency, the code morphing software can choose to be interrupted when the FIFO 43 has been drained to less than half full. The software can set a DMA READ MORE register 45 which causes an interrupt when the read address valid bit in register 44 is set and the FIFO 43 is less than half full. A mutual exclusion lock is implemented in order to prevent a race between bus interface hardware accepting a new DMA read request (i.e. changing read address register 44) and software filling FIFO 43 based on an old value of read address register 44. Software requests the mutual exclusion lock by writing some value into the DMA lock register 48 and then reading that register to determine whether the lock was granted. Software releases the mutual exclusion lock as a side effect of writing DMA Read Done register 46.

The bus interface hardware must acquire the mutual exclusion lock before accepting a new DMA read request (i.e. a request the address of which does not match read address 44). If the request by hardware for the lock is denied, then the new read is refused; and the DMA device is signaled to retry again later. If the lock is granted to the hardware, the lock is released as a side-effect of software writing DMA Read Done register 46.

The process followed is: a DMA read request presented on the I/O bus when the pending read flag in register 47 is clear causes hardware to set the read address register and the valid bit 44, empties the FIFO 43, sets the pending read flag in register 47, and queues the read command and the address in FIFO 31. Then, the read command is removed from FIFO 31 and placed in status registers 32 and 33, and the address is placed in DMA address 35 thereby generating an interrupt. The software reads the command and address thereby terminating the interrupt. The software reads memory data at the starting address specified by DMA address 35 and stores it through DMA Out register 42 into the FIFO 43. The software can then set the DMA Read More register 45 to indicate that it is willing to read more. When the software is done with the request, it sets Read Done register 46. The data is read from the FIFO 43 by the I/O device. If the DMA I/O device drains the FIFO 43 to less than half full, a read more interrupt is generated which is accepted by the software. The software attempts to acquire the mutual exclusion lock; if it succeeds, it furnishes more data to FIFO 43 starting at the memory address following the address where it left off during the previous series of stores to FIFO 43. The software may leave the read more bit set to indicate it is still willing to provide more data if the FIFO 43 empties. The software stores to DMA Read Done register 46 indicating it has completed servicing the read-more interrupt and is releasing the lock. If the processor fails to get the lock, then it ignores the interrupt. DMA Read More register 45 is cleared automatically whenever hardware accepts a new DMA read request or read address valid bit in register 44 is cleared.

Although the present invention has been described in terms of a preferred embodiment, it will be appreciated that various modifications and alterations might be made by those skilled in the art without departing from the spirit and scope of the invention. For example, although the invention has been the embodiment described has been designed to function with a particular family of processors, it should be understood that the invention applies just as well to programs designed for other processor architectures, and programs. The invention should therefore be measured in terms of the claims which follow.

What is claimed is:

1. Apparatus for accomplishing direct memory access in a computer system including a central processor comprising:

means for generating an interrupt or an exception when a direct memory access by an input/output (I/O) device is desired, means for suspending the operation of the central processor in response to the interrupt or exception, means for effecting correct consistent state of the computer system in response to the interrupt or exception, means for determining a memory operation commanded by the I/O device, and means for causing the central processor to execute the memory operation commanded by the I/O device.

2. Apparatus as claimed in claim 1 in which the means for effecting correct consistent state of the computer system in response to the interrupt or exception includes software means executing on the central processor in response to the interrupt or exception for rolling back execution to a point at which last known correct state existed.

3. Apparatus as claimed in claim 1 in which the means for effecting correct consistent state of the computer system in response to the interrupt or exception includes means for testing consistency between instructions being written to a memory address by a direct memory access and translations of instructions at the memory address.

4. Apparatus as claimed in claim 1 in which means for determining a memory operation commanded by the I/O device comprises storage for I/O commands from I/O devices, and software means executing on the central processor for detecting stored I/O commands.

5. Apparatus as claimed in claim 1 which further comprises means for queuing direct memory access requests from I/O devices.

6. Apparatus as claimed in claim 1 which further comprises means for queuing data transferred in response to direct memory access requests from I/O devices.

7. Apparatus as claimed in claim 1 which further comprises means for executing a series of operations that together restore inconsistent target state to consistent target state, before executing a DMA request.

8. Apparatus as claimed in claim 1 which further comprises means for generating a speculative DMA interrupt so that memory may be read in anticipation of a subsequent DMA operation that will use that data.

9. Apparatus as claimed in claim 1 which further comprises means for providing a software-visible lock that allows hardware and software to cooperate to ensure they do not update shared resources at the same time.

10. Apparatus as claimed in claim 1 which further comprises means to ensure that each DMA write operation presented to the host software process writes to memory on at most one host page.

11. A method for providing direct memory access in a computer system including a central processor comprising the steps of:

generating an interrupt or an exception when a direct memory access by an input/output (I/O) device is desired, suspending operation of the central processor in response to the interrupt or exception, effecting correct consistent state of the computer system in response to the interrupt or exception, determining a memory operation commanded by the I/O device, and utilizing the central processor to execute the memory operation commanded by the I/O device.

12. A method as claimed in claim 11 further comprising restarting operation of the central processor suspended by the interrupt or exception beginning at a point in execution at which last known consistent state existed.

13. A method as claimed in claim 11 in which the step of effecting correct consistent state of the computer system in response to the interrupt or exception includes executing a software process on the central processor in response to the interrupt or exception for rolling back execution to a point at which last known consistent state existed.

14. A method as claimed in claim 11 in which effecting correct consistent state of the computer system in response to the interrupt or exception includes means for testing consistency between instructions being written to a memory address by a direct memory access and translations of instructions at the memory address.

15. A method as claimed in claim 11 in which the step of determining a memory operation commanded by the I/O device comprises storing I/O commands from I/O devices, and executing software on the central processor for detecting stored I/O commands.

16. A method as claimed in claim 11 which further comprises queuing direct memory access requests from I/O devices.

17. A method as claimed in claim 11 which further comprises queuing data transferred in response to direct memory access requests from I/O devices.

18. A method as claimed in claim 11 which further comprises executing a series of operations that together restore inconsistent target state to consistent target state, before executing a DMA request.

19. A method as claimed in claim 11 which further comprises generating a speculative DMA interrupt so that memory may be read in anticipation of a subsequent DMA operation that will use that data.

20. A method as claimed in claim 11 which further comprises providing a software-visible lock that allows hardware and software to cooperate to ensure they do not update shared resources at the same time.

* * * * *